Patented Aug. 30, 1932

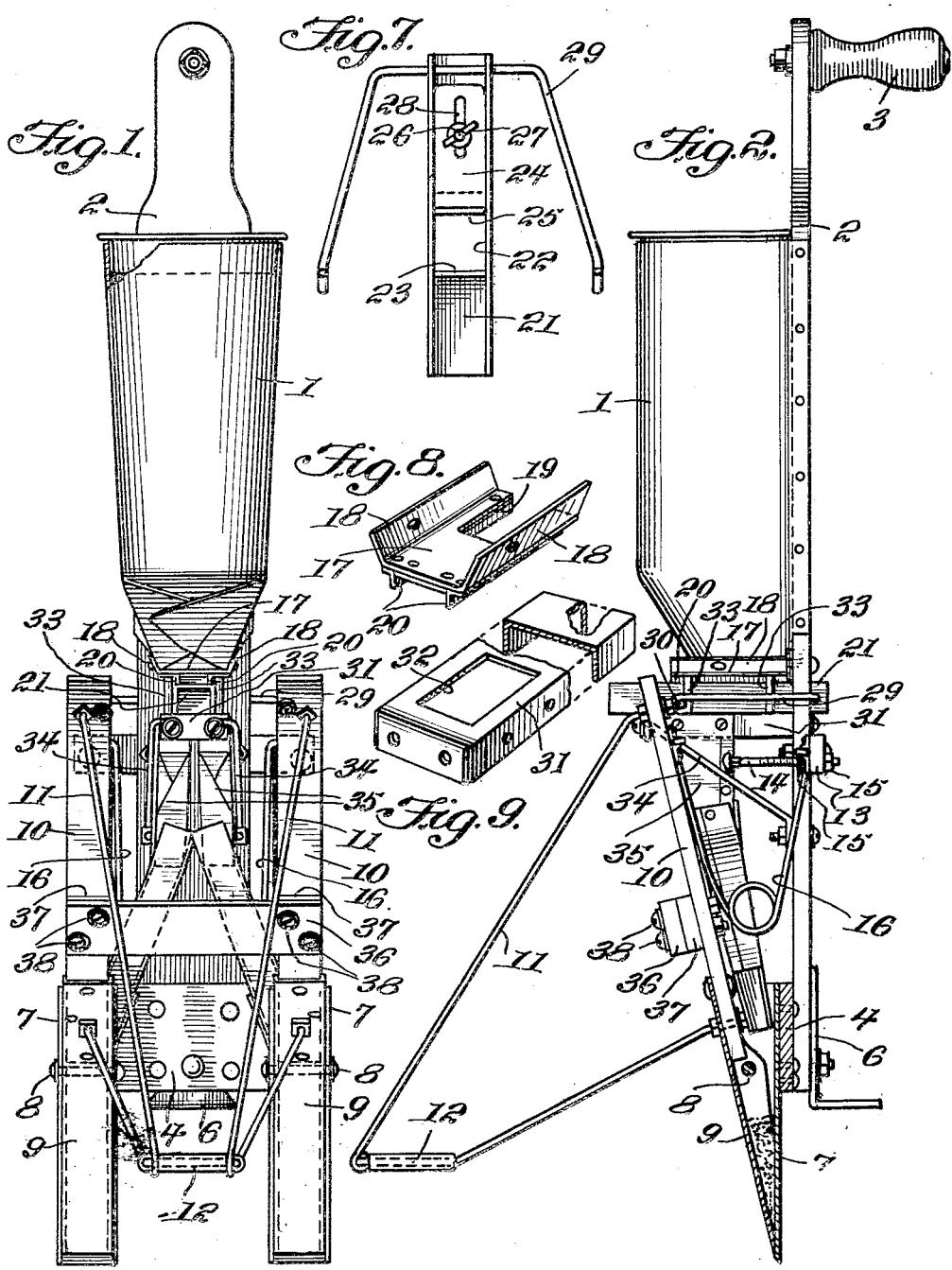

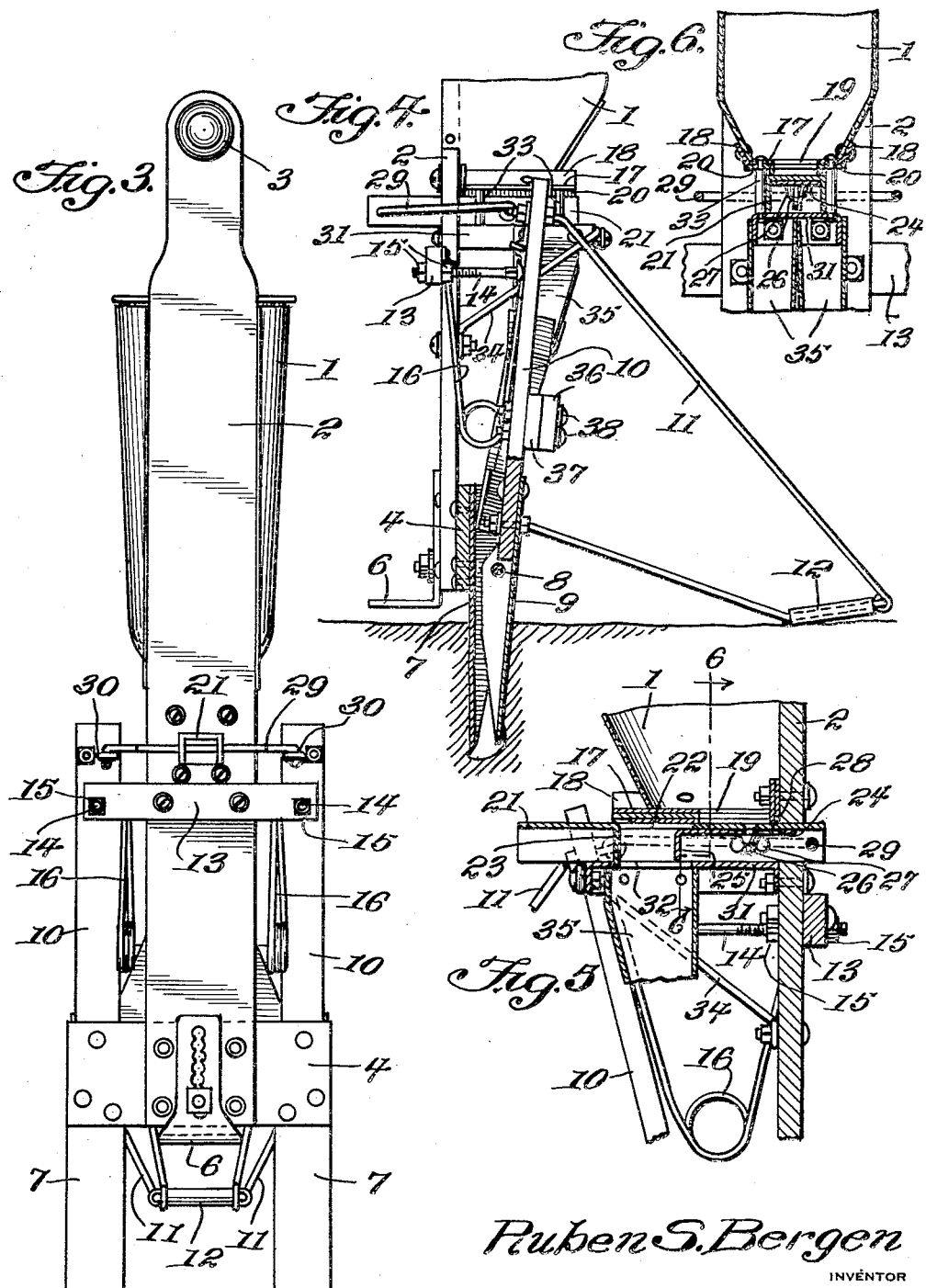

1,874,425

UNITED STATES PATENT OFFICE

RUBEN S. BERGEN, OF SCANDINAVIA, WISCONSIN, ASSIGNOR TO PLANT FOOD APPLIANCE COMPANY, OF WAUPACA, WISCONSIN, A CORPORATION OF WISCONSIN

HAND FERTILIZER APPLIER

Application filed July 20, 1931. Serial No. 552,029.

My present invention has reference to a new and novel construction of a hand operated device for depositing a determined amount of fertilizer in the ground to the opposite sides of growing plants, such as potatoes, corn or the like, or to the opposite sides of a germinating seed for such plants to enrich the soil and to strengthen the growing plants and assist in the germination of the seeds without injury to either the plants or the seed.

A further object is the provision of a hand operated fertilizer depositor or dropper which is of a simple but novel construction, which may be regulated to deposit the fertilizer a determined depth in the soil and which may be easily and accurately operated.

To the attainment of the foregoing the invention consists in the improvement hereinafter described and definitely claimed.

In the drawings:

Figure 1 is a front elevation of my improved implement.

Figure 2 is a side elevation thereof.

Figure 3 is a rear elevation thereof.

Figure 4 is a side elevation looking toward the lower end of the improvement with parts in section, and illustrating the jaws penetrating the ground and open position to deposit a quantity of fertilizer in the ground.

Figure 5 is a detail transverse sectional view through the lower or outlet end of the fertilizer chamber, together with the arrangement of the slidable valve and the guide therefor, showing the manner in which the valve sweeps along the guide to deposit the fertilizer into the chute or hopper.

Figure 6 is a sectional view on the line 6—6 of Figure 5.

Figure 7 is an inverted plan view of the slidable valve.

Figure 8 is a detail perspective view of the bottom plate for the fertilizer chamber.

Figure 9 is a perspective view of the fertilizer outlet pipe over which the valve slides.

Referring to the drawings in detail the numeral 1 indicates a fertilizer chamber provided with the usual closure. The chamber is constructed of metal and has an open front whose edges are tacked or otherwise secured to the edges of a wooden plate 2, the plate extending a suitable distance above the chamber and providing a handle 3. The plate 2 is of a length to extend a suitable distance below the bottom or outlet end of the chamber 1 and has centrally fixed to its lower end a transverse plate 4. To the member 2, at its juncture with the plate 4, there is adjustably fixed an angle bracket 6 whose lower or horizontal portion is outwardly directed and which affords a rest for the foot of the operator as well as a gage for limiting the entrance of the jaws, presently to be described, into the soil. The plate 4 has secured on its inner face at its ends steel penetrating jaws or blades 7, respectively, and these stationary jaws or blades have flanged sides between which is pivoted, as at 8, the relatively movable jaws or blades 9 and the members 9 are divergently related to the members 7. Each of the relatively movable jaws 9 has fixed thereto an arm 10, the said arms being upwardly directed, and the said arms have secured, adjacent to their upper and lower ends the ends of angularly arranged strands of strong wires or rods 11 which have their lower portions straight and which pass through the rolled edges of a plate that comprises a foot rest 12.

The member 2, above the transverse plate 4, has secured thereto another transverse plate 13 that has adjustably screwed through its ends headed bolts 14 which are engaged by inner and outer nuts 15, respectively. The headed bolts are disposed opposite the arms 10 and serve as contact or stop means for limiting the relatively movable arms 10 with respect to the member 2, and consequently limit the opening of the relatively movable jaws 7 and 9. Between the plate 13 and the respective arms 10 there are secured the ends of a duplex wire spring 16, the said spring being of strong wire and the arms thereof have their central portions coiled upon themselves. The arms thus exert an outward pressure away from each other and, therefore, swing the arms 10 at an outward angle from the member 1 to close the jaws.

The lower walls provided by the fertilizer receiving chamber are inclined inwardly and the outlet mouth of the said chamber is partly closed by a bottom plate 17, best illustrated by Figure 8 of the drawings. The plate has side flanges 18 which are riveted to the sides of the bottom of the chamber 1 and the said plate 17 has a rear opening 19 therein that provides an outlet for the fertilizer in the chamber 1. In addition to this the bottom of the plate 17 has fixed thereon spaced angle irons whose depending portions 20 afford bearings for the slidable valve 21 of the device. The valve 21 is in the nature of a cross sectionally U-shaped member and is provided on its top face, which rides over the guides 20, with an opening 22 that is normally out of register with the opening 19. The outer wall provided by the opening 22 is formed with a downwardly extending flange 23 (Figure 5), and on the under face of the top of the slide valve, to the rear of the opening 22, there is arranged a plate 24 that has its outer end flanged downwardly, as at 25, and this flange provides a scraper element. The plate 24 has an elongated opening therethrough and there is fixed to the top of the valve 21 a bolt member 26 which is engaged by a wing nut 27, the bolt, of course, passing through the mentioned elongated slot 28 in the plate 24 of the scraper. By this arrangement it will be seen that the scraper can be longitudinally adjusted with respect to the flange 23 of the valve.

One end of the valve passes through an opening in the member 2 and there is passed through this end of the said valve the connecting end for the angle arms of the yoke-shaped strong wire member 29. The arms of the yoke have their ends hooked and these hooks are received through eyes 30 in the ends of bolts that pass through and are connected by nuts to the arms or relatively movable members 10. The lower edges of the cross sectionally U-shaped valve 21 ride over the top of a substantially rectangular plate 31. The plate has its top provided with an opening 32 that is normally in register with the outlet opening 22 in the valve 21. The plate is secured to the bottom plate of the fertilizer by spaced bolts or analogous means 33, and the outer wall of the flanged member 31 has fixedly secured thereto the ends of the angle brace rods 34, the second ends of the said brace rods being secured to the inner face of the member 2, and secured to the member 31 and likewise entering the said member to communicate with the opening 32 therethrough there are the upper ends of oppositely directed angularly disposed spouts 35, each of said spouts delivering to the open mouths of the respective jaws.

The relatively movable members 10 are connected together and thereby reinforced by a transverse plate 36. The said plate rests on blocks 37 which are in direct contact with the members 10 and the securing means 38 for the brace member 36 passes through these blocks and are secured to the said members 10. Preferably the elements 38 are in the nature of bolts which are engaged by suitable nuts.

The implement is of a strong and sturdy construction. The chamber 1 is of a size to contain a large quantity of fertilizer therein. The jaws are arranged in spaced relation so that the same can be positioned to the opposite sides of a growing plant or a germinating seed. A downward pressure upon the handle and upon the angle bracket 6 will cause the jaws to enter the earth. A canting of the implement, with the foot rest in ground contacting position, will cause the relatively movable jaws to slide away from the relatively stationary jaws, so that a predetermined quantity of the fertilizer will be deposited in the soil along the opposite sides of the plant or germinating seed. It should be stated that such quantity of fertilizer is at all times held between the closed jaws. The movement of the implement in depositing this quantity of fertilizer causes the slidable valve to be moved to a position opposite the opening 19 in the plate 17, so that a quantity of fertilizer will be received between the flanges 23 and 25 of the valve. When the jaws of the implement are drawn out of the ground the spring will slide the valve to the position disclosed by Figures 2 and 5 of the drawings so that the fertilizer scraped along the member or plate 31 will be moved over the opening 32 therein and caused to drop through the hopper and from thence into the closed jaws. The canting of the implement sufficient to cause the jaws to be swung to open position is caused by the contact of the foot or rest 12 with the surface of the ground. The implement may be operated on even or hilly surfaces. The construction is strong and durable. The quantity of fertilizer delivered between the jaws is not only regulated by the adjustable plate on the valve but by the contact elements 14 which limit the spreading of the movable jaws away from the relatively fixed jaws, and it will be further noted that I have produced a simple, inexpensive and highly efficient hand fertilizer depositor. While the present embodiment of my invention appears at this time to be preferable, I do not wish to be limited to the actual construction and arrangement shown but reserve the right to make such changes therefrom as fairly fall within the scope of what I claim.

Having described the invention, I claim:

1. A hand operated fertilizer depositor, comprising a pair of relatively movable members, each provided with cooperating pairs of earth penetrating jaws, and said jaws comprising each a pair of members which are hingedly connected, spring means influencing the members away from each other to close the jaws, a fertilizer chamber on one of the members, a slotted plate closing the lower outlet end of the chamber, a channeled valve member slidable beneath the plate and having an opening therein whose ends are flanged and which opening is normally out of alinement with the opening in the plate, said valve being movable through one of the members, and a yoke connected with the valve and connecting the valve with the other member, said valve designed to register with the opening in the plate when the members are moved relatively with respect to each other in one direction, a chute to register with the valve when in its normal position, and said chute comprising two sections, each of which communicate with the respective jaws.

2. A hand operated fertilizer depositor comprising a pair of relatively movable members, each provided with cooperating pairs of earth penetrating jaws, and said jaws comprising each a pair of members which are hingedly connected, spring means influencing the members away from each other to close the jaws, a fertilizer chamber on one of the members, a slotted plate closing the lower outlet end of the chamber, a channeled valve member slidable beneath the plate and having an opening therein whose ends are flanged and which opening is normally out of alinement with the opening in the plate, said valve being movable through one of the members and a yoke connected with the valve and connecting the valve with the other member, said valve designed to register with the opening in the plate when the members are moved relatively with respect to each other in one direction, guide means carried by the plate for the valve, a plate having an opening therethrough over which the valve slides, a chute connected with the plate surrounding the opening thereof and comprising two sections, each of which is directed to the respective jaws, and one of the flanges on the valve plate being adjustable with respect to the other flange, for the purpose set forth.

In testimony whereof I affix my signature.

RUBEN S. BERGEN.